United States Patent [19]
Curry

[11] Patent Number: 5,872,868
[45] Date of Patent: Feb. 16, 1999

[54] TECHNIQUE FOR GENERATING AND STORING EDGE PHASE INFORMATION FOR RENDERING TEXT AND LINEART IN HYPERACUITY PRINTERS

[75] Inventor: Douglas N. Curry, Menlo Park, Calif.

[73] Assignee: Xerox Corporation, Stamford, Conn.

[21] Appl. No.: 726,328

[22] Filed: Oct. 3, 1996

[51] Int. Cl.[6] .................................................. G06K 9/36
[52] U.S. Cl. .......................... 382/266; 382/269; 358/458
[58] Field of Search ..................... 358/455–458, 358/448; 382/199, 266–269

[56] References Cited

U.S. PATENT DOCUMENTS

| | | | |
|---|---|---|---|
| 4,586,037 | 4/1986 | Rosener et al. | 340/728 |
| 4,825,381 | 4/1989 | Bottorf et al. | 364/443 |
| 4,868,587 | 9/1989 | Loce et al. | 346/157 |
| 5,041,920 | 8/1991 | Hayes et al. | 358/456 |
| 5,321,525 | 6/1994 | Hains | 358/456 |
| 5,408,593 | 4/1995 | Kotaki et al. | 395/122 |
| 5,410,414 | 4/1995 | Curry | 358/298 |
| 5,432,898 | 7/1995 | Curb et al. | 395/143 |
| 5,479,584 | 12/1995 | Curry | 395/102 |
| 5,485,289 | 1/1996 | Curry | 358/448 |

Primary Examiner—David K. Moore
Assistant Examiner—Stephen Brinich
Attorney, Agent, or Firm—Fay, Sharpe, Beall, Fagan, Minnich & McKee

[57] ABSTRACT

A PDL or other type of line drawing program mathematically generates an edge between white and black regions. For curved edges, the edge is transformed into a plurality of piecewise linear edge segments (20). Pixels (u,v) in the vicinity of the edge are identified (12). Each pixel is assigned a magnitude value in accordance with its distance from the mathematically defined edge relative to a width or gray span (22) of the selected vicinity. The magnitudes in each of a plurality of subregions of the selected vicinity define a sloping plane (42). The threshold (t), such as a value mid-way between the extremes of the selected vicinity, defines a plane (44) which intersects the sloping plane. The line (46) of intersection defines the edge. A hyperacuity printer receives slope of the plane relative to a scan and orthogonal directions of the printer, and a magnitude for each pixel. Based on the slope and magnitude information, the printer determines (16) intensity and fast scan direction offset of a corresponding exposure value and prints (17) a corresponding dot.

21 Claims, 4 Drawing Sheets

5,872,868

TECHNIQUE FOR GENERATING AND STORING EDGE PHASE INFORMATION FOR RENDERING TEXT AND LINEART IN HYPERACUITY PRINTERS

BACKGROUND OF THE INVENTION

The present application relates to the hyperacuity printing arts. It finds particular application in conjunction with text rendering and lineart drawing or line stroking and will be described with particular reference thereto. It is to be appreciated, however, that this technique will also find application in other areas.

In bit map rendering and drawing techniques, an image is divided up into a rectangular grid of very small cells, each of which may be black or white. Because each cell may be only black or white, the picture can then be stored as a series of bits, one bit for each cell, i.e., a bit map of the image.

One difficulty with bit map images resides in the stair-stepping artifact that occurs when producing straight edges that are not perfectly aligned with the vertical or horizontal structure of the bit map. The stair-stepping artifact is most pronounced when the edge to be rendered is almost horizontal or vertical. In such straight lines, the edge passes along a line of pixels for a distance which is dependent upon the degree of offset from horizontal or vertical, then steps to a next adjoining line of pixels for some distance, then steps again to the next adjacent line, etc. This stair-stepping seriously degrades the visual quality of the resultant image.

To suppress the stair-stepping, drawing generation programs, such as page decomposition language (PDL) programs, typically increase the resolution, i.e, more bits per line and more lines per inch. This, of course, does not remove the stair-stepping, but merely make finer or smaller steps such that it is harder for the human eye to detect the steps. Resolution, however, is expensive in that halving the bit size doubles the number of bits per line and doubles the number of lines per inch, i.e., requires four times as much information, hence, four times as much processing time and much more precise scanning and printing equipment.

A hyperacuity printer improves the image quality by eliminating or reducing stair-stepping, without increasing overall resolution. In hyperacuity printing, information concerning the location where the edges are to be printed is maintained with a high degree of accuracy, but without increasing the resolution of the input data. Instead of using a bit map of the desired image of text (or lineart) to be printed, a bytemap is used. Each bit position is replaced with a multi-bit byte of coded information, such as a gray value or pixel. The information contained in these multi-bit gray pixels is processed with neighboring gray pixels within the hyperacuity printer to generate an identification of where the edges should be placed. This information, in turn, is used to adjust the exposure in the printer in an optimal manner in order to produces edges that do not have stair-stepping, but remain straight. Typical exposure parameters include intensity which adjusts the overall size of the printer dot (typically used for edge adjustments in a direction transverse to the fast scan direction) and timing to shift the position of the dot along the fast scan direction. An appropriate hyperacuity printer is illustrated in U.S. Pat. No. 5,485,289 of the inventor herein.

The present invention contemplates a new and improved technique to convert line information generated by drawing programs, such as PDL programs and others, into appropriate format for display on a hyperacuity printer.

SUMMARY OF THE INVENTION

In accordance with the present invention, a method is provided for generating data for controlling a hyperacuity printer. An edge is defined mathematically. Pixels within a selected vicinity of the edge are identified, which vicinity extends between boundaries disposed equally on opposite sides of the edge. A distance between each pixel and the edge is determined. For each pixel, an intensity value related to the position of the edge to be placed by the hyperacuity printer on a print medium is generated.

In accordance with more limited aspects of the present invention, the selected vicinity is selected by selecting a gray span value which indicates a number of pixel widths between the opposite boundaries of the selected vicinity.

In accordance with another more limited aspect of the present invention, the edge is divided into a plurality of piecewise edge segments. An angular bisector is defined between adjacent edge segments and a mid-point bisector is defined which extends through a mid-point of each edge segment. In this manner, the selected vicinity is divided into a plurality of sub-regions.

In accordance with another more limited aspect of the present invention, the magnitude for each pixel within the selected vicinity is defined in accordance with a distance between the pixel and the edge. From the relative magnitudes of each of the plurality of pixels within a sub-region of the vicinity, a sloping plane is defined. The intensity values for the printer dots are selected in accordance with a slope of the plane and a magnitude of the corresponding print pixel.

In accordance with another aspect of the present invention, an apparatus for hyperacuity printing is provided. A means defines an edge mathematically. A means identifies pixels within a selected vicinity of the edge. A means determines the distance between each pixel and the edge. Another means generates an exposure value to make each of a plurality of pixels tangent to the edge. A hyperacuity printer prints this pixel map in accordance with the processing described in U.S. Pat. No. 5,485,289.

One advantage of the present invention resides in the smoothness of its edges and freedom from stair-stepping.

Another advantage of the present invention resides in its speed. Sharp edges are obtained even at relatively low resolutions.

Another advantage of the present invention is that it speeds up filling of closed regions.

Another advantage of the present invention resides in reduced memory requirements and processing bandwidth.

Another advantage of the present invention resides in the fact that text and lineart data generally requires higher resolution bitmaps than data meant to be halftoned, such as natural images, because of the stairstepping artifacts mentioned above. With this invention, data meant to become text and lineart can be stored at the same (courser) resolution as data meant to be halftoned.

Another advantage of the present invention is that the storage format is essentially device independent and can be used to drive hyperacuity printers with a full range of scan frequencies, clock frequencies, and spot sizes, as well as various types of hyperacuity printers from inkjet to laser.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
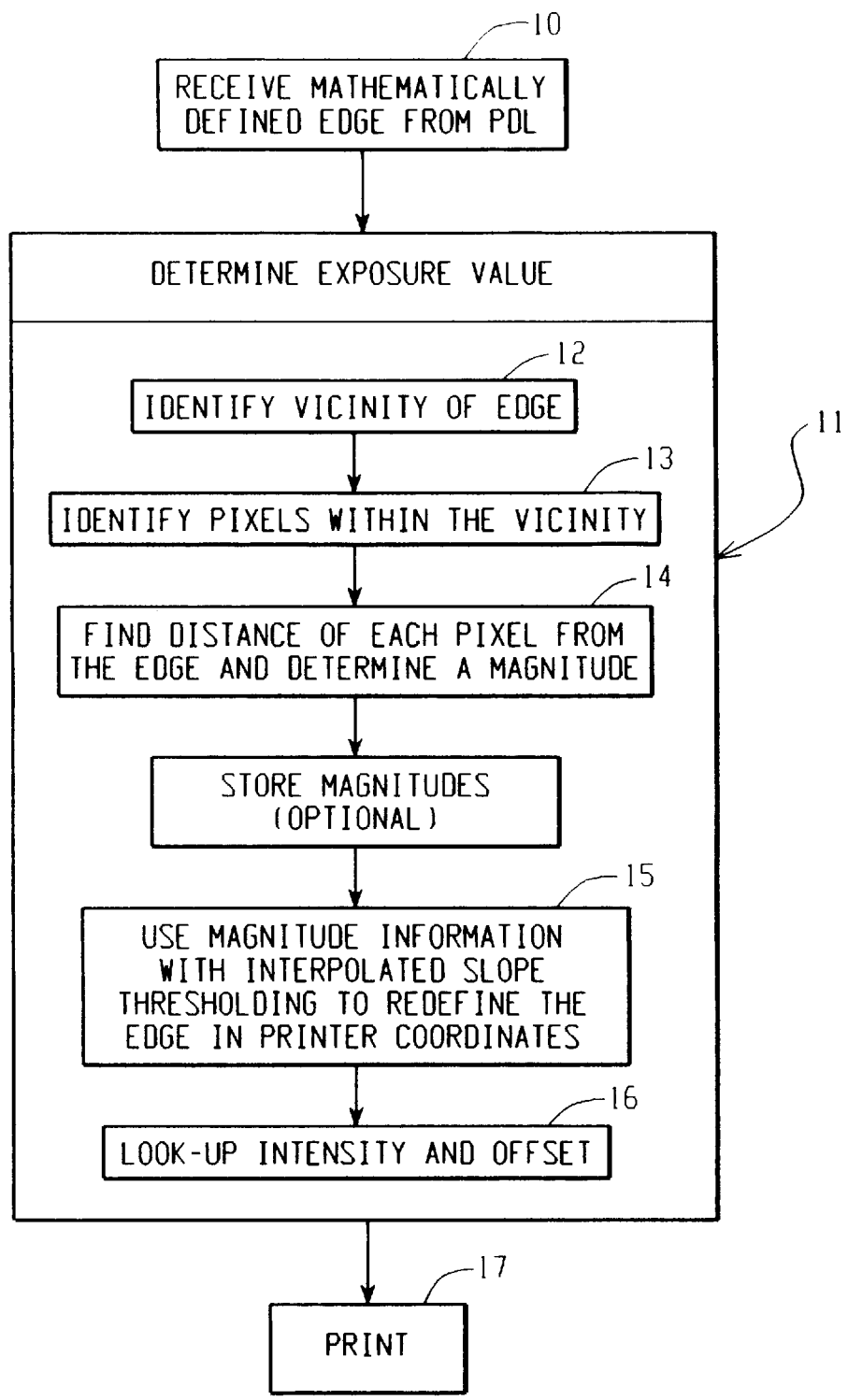
FIG. 1 is a flow diagram illustrating the method aspect of the present invention.

With reference to FIG. 1, a mathematically defined edge is received 10, such as from a PDL program or other source. Next, an exposure value, such as intensity or amount of offset in a fast scan direction are determined 11 in accordance with a distance and direction of each pixel from the edge.

Figure 2:
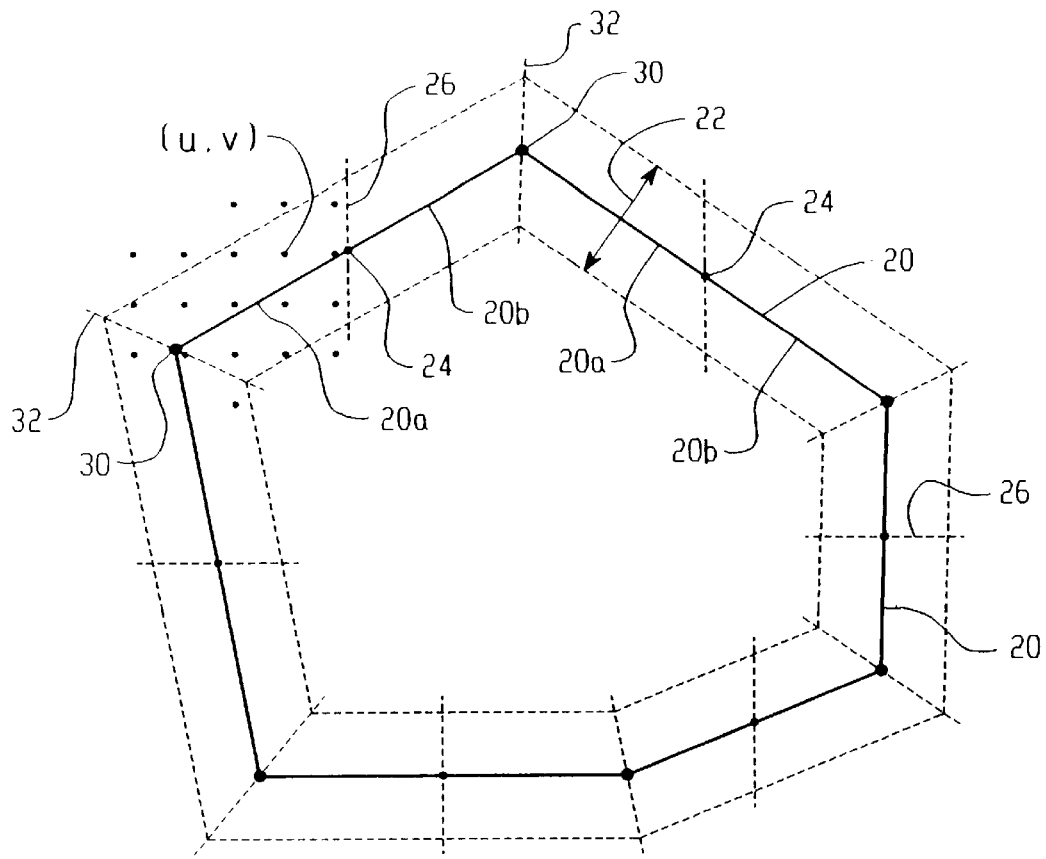
FIG. 2 is a diagrammatic illustration of edge determination in accordance with the present invention.

Looking in detail to the step of defining a mathematical edge, PDL type programs typically have a plurality of curved and straight line drawing options. One technique for drawing a curve is to allow the user to select several points. The program then uses a cubic spline or other interpolation technique to define mathematically a smooth curving line through or substantially through the points. In the preferred embodiment, this cubic spline or other mathematically defined curve is divided into a multiplicity of piecewise linear segments 20 for simplicity of mathematical calculations. FIG. 2 illustrates a closed curve broken into a plurality of linear edge segments. The linear segments in FIG. 2 are very coarse for simplicity of illustration. Typically, a much larger number of smaller linear segments are selected to approximate the curve more smoothly. A straight line, of course, can have one long segment.

To determine the exposure, first a distance from the edge which is going to be considered as within the vicinity of the edge is defined 12. This distance or width is denoted as a "gray span". The gray span 22 is normally measured in pixel widths. A gray span in the range of 2–3 pixel widths is preferred to assure that at least one partial intensity pixel will be found on either side of an edge.

Each linear edge segment 20 is divided into two segments 20a, 20b by finding its centroid position 24. A line 26 is drawn through the centroid position as far as a gray span boundary 24. In the preferred embodiment, the line 26 is drawn in the slow scan direction (depicted as vertical) when the linear segment 20 is within 45° of the fast scan direction (depicted as horizontal) and is drawn in the fast scan direction when the line segment is within 45° of the slow scan direction. In this manner, discontinuities are avoided which would occur if the edge segment 20 was parallel to the segment bisector line 26. The 45° dividing line between the slow scan direction and the fast scan direction segment bisector lines creates a symmetry which simplifies mathematical calculations. At each intersection 30, between edge segments, an angular bisector line 32 is defined. The line 32 is selected such that the angle between itself and each of the adjacent line segments is the same. In this manner, areas or four-sided polygonal regions are defined, which mark the vicinity of the edge.

A pixel identifying step 13 identifies each of the pixels (u,v) within each of the polygonal regions, i.e., the pixels in the polygonal vicinity of the edge.

Figure 3:
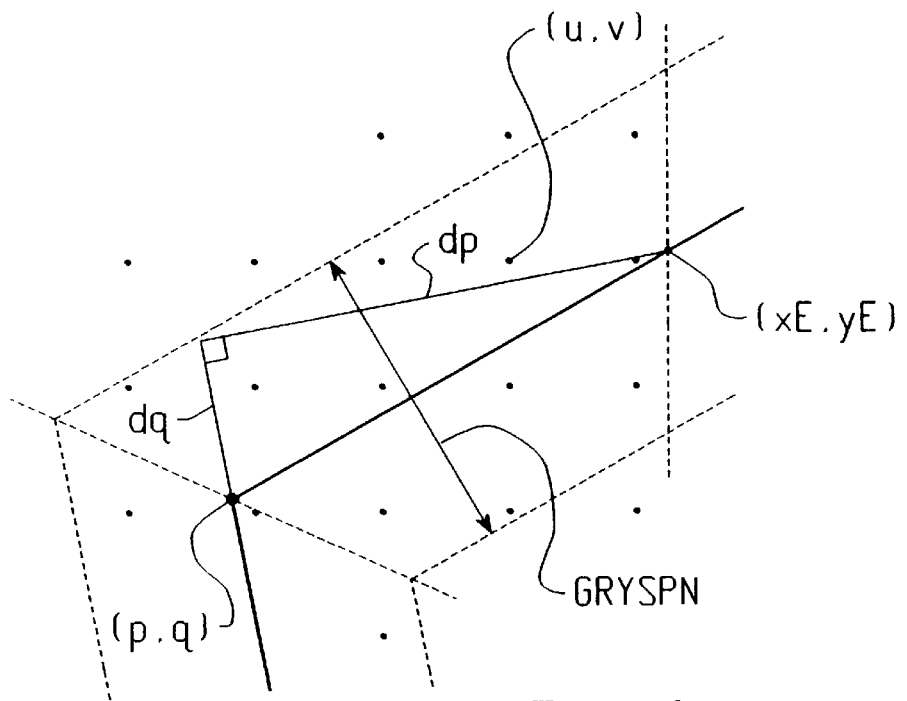
FIG. 3 is a detailed view of one of the segments of FIG. 2.

With reference to FIG. 3, each pixel (u,v) is evaluated 14 to determine the distance in the fast and slow scan directions between the pixel and the line. In the preferred embodiment, the pixels are evaluated in accordance with Equations (1a) and (1b) as follows:

$$\text{FAST SCAN DIST.}(u,v) = \text{SENSE} \frac{(v - yE) \cdot dp - dq \cdot (u - xE)}{GrySpn|dq|} \quad (1a)$$

$$\text{SLOW SCAN DIST.}(u,v) = \text{SENSE} \frac{(v - yE) \cdot dp - dq \cdot (u - xE)}{GrySpn|dp|} \quad (1b)$$

where the quantities yE, xE, dp, and dq are defined in FIG. 3. Note that dp and dq are further defined as:

$$dp = p - xE \quad (2a),$$

$$dq = q - yE \quad (2b).$$

The term "SENSE" denotes whether the edge segments are being evaluated in a clockwise or counterclockwise direction. This affects the polarity of the determined slope, i.e., whether one is going from black to white or white to black.

The edge is redefined 15 in the printer coordinate system using a slope thresholding technique or step. More specifically, the magnitudes for each pixel are determined on a relative scale such that the pixels exactly on one of the gray span edges are given a maximum value, e.g., 255, and pixels exactly on the other edge are given a minimum value, e.g., 0. Pixels exactly on the edge will have a threshold value t mid-way between the two extremes, e.g., 128. Within each of the evaluated polygonal regions, the magnitudes of each pixel at the central position of each pixel define a sloping plane. Similarly, the threshold magnitude, 128 in the present example, defines a second plane. These two planes intersect to define the edge.

Figure 4:
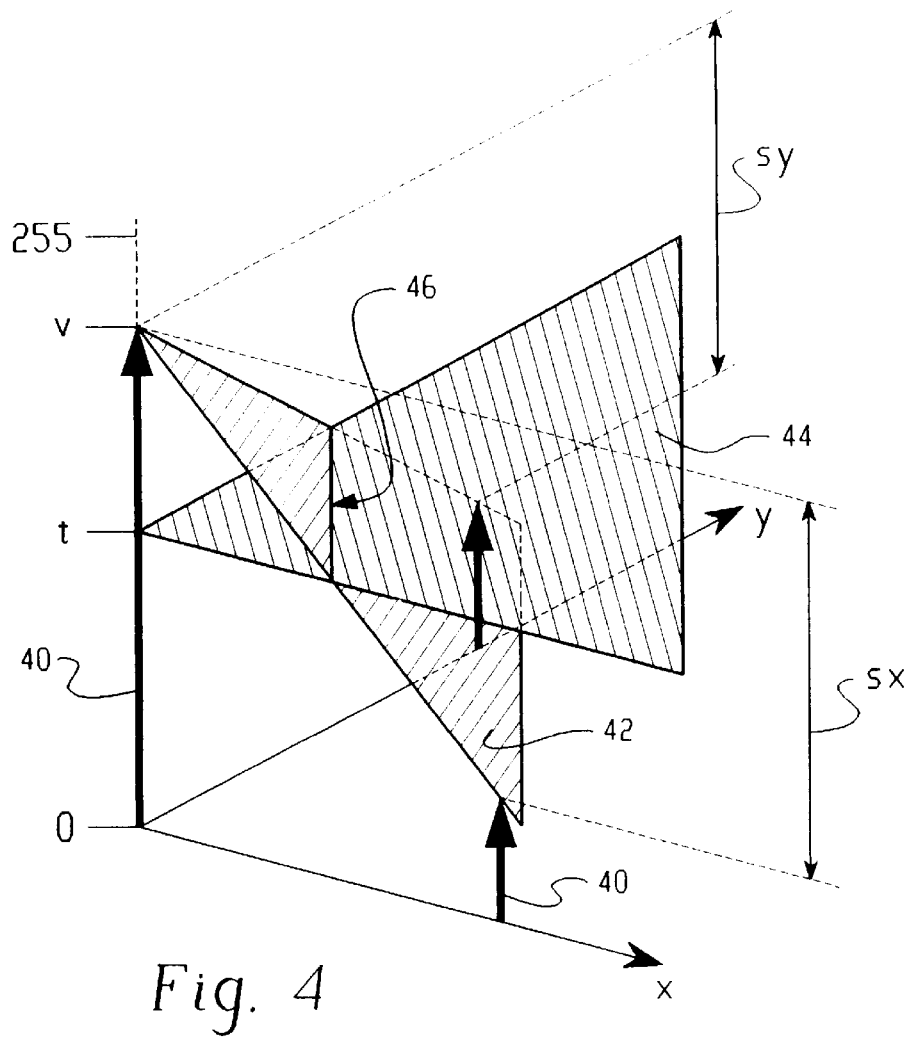
FIG. 4 illustrates the slope thresholding technique.
Figure 5:
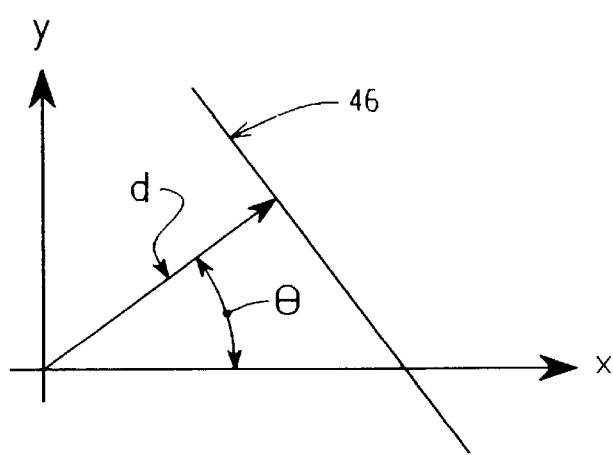
FIG. 5 illustrates how the text or lineart edge determined from FIG. 4 can be fully defined by polar coordinates.

With reference to FIG. 4, when magnitudes 40 for at least three pixels (u,v) are defined within a given polygon, the magnitudes define the sloping plane 42. At any given resample or line segment, the triplet of the three magnitudes determines such a plane. The set of sloped planes produced at each resampled point can be understood as a piecewise linear reconstruction of the sampled input data. A threshold which determines the exposure and development process is defined as a parallel plane 44, with the fast and slow scan axes passing through the threshold value, e.g., 128. The intersection of the plane 42 defined by the triplet (or more) magnitudes and the threshold plane 44 is a line 46. This line 46 is a piecewise linear estimate of where the original input data crosses the threshold and can have, when projected onto the x,y-plane, various angles θ and distances d from the resampled x,y-position (FIG. 5). The spatial precision of these piecewise linear estimates substantially exceeds the resolution of the input data, which is exemplified by the spacing (period) of the input square array.

With reference to FIG. 5, the formulas defining the distance d and angle θ of the projection into the plane 44 of the line intersection are:

$$d = \frac{dp \cdot (t - v)}{\sqrt{sx^2 \cdot f^2 + sy^2 \cdot p^2}}, \tag{3a}$$

$$\theta = \arctan\left(\frac{sy \cdot p}{sx \cdot f}\right), \tag{3b}$$

where d is the radial distance of the normal from the current resample to the line of intersection of the two planes and θ is the angle in the x,y-plane of that normal with respect to the x-axis. The resample frequency dp, is set to the optimechanical resolution of the laser scanning device, e.g., 600 per inch. The values f and p are the resolutions of the input data in the fast scan or x-direction and the slow scan or y-direction, respectively. The distance to the edge d is an assigned number which has units of both scans in both and fast and slow scan directions (assuming square resampling). A +d means that the spot is an exposed region and a −d indicates an unexposed region. A θ=0 indicates a vertical edge directly in front of the moving spot and an angle of θ=90° identifies that the edge is parallel to the line of movement. For example, an edge of 45° to the fast scan direction would be seen as positive, but decreasing values of d at θ=45°. As the center of the spot passes over the edge, the d values would become decreasingly negative and the angle would change to −135°.

After determining the sloped edges surrounding a closed region, a scanning algorithm is used to fill in the pixels inside the region. By observing that the region is purposefully made so that the slopes extend into the region as the banks of a canal or lake shore, it is easy to see that a scanning raster algorithm can fill the interior simply by noting where the slopes descend and ascend. As long as these regions do not overlap with other similar regions, such as is often the case with text, this algorithm is much faster than the "winding rule" counterpart currently used in the art.

The sampled image with 3–4 bits of numerical precision is generally sufficient to print smooth and relatively stairstep free text and lineart, often when source resolutions f and p are below 300 dpi.

Figure 6:
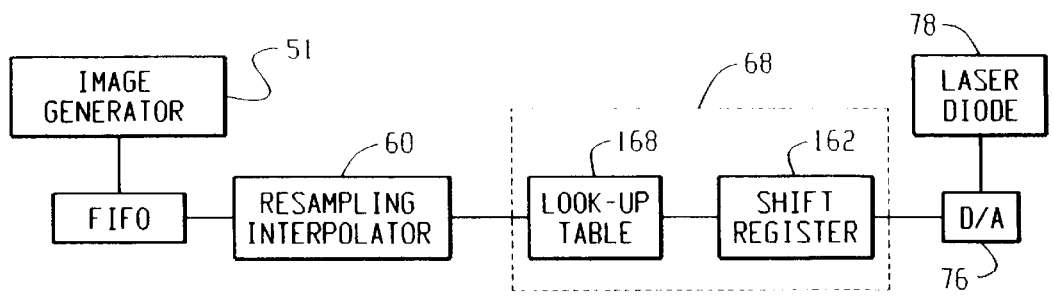
FIG. 6 illustrates processing the generated data with a hyperacuity printer.

With reference to FIG. 6 and as explained in greater detail in aforementioned U.S. Pat. No. 5,485,289, a thresholder 68 receives the slope in an x or fast scan direction, slope in the y or the slow scan direction, and the magnitude value, i.e., distance d from the edge calculated as described above by an image generator 57. The thresholder 68 includes a threshold function block 160, preferably a look-up table. A resampling interpolator interpolates from the resolution of the image generator to the resolution of the printer, e.g., 300 dpi, 600 dpi, etc. The look-up table 160 is addressed 16 by the two slope values and the magnitude value to retrieve a corresponding intensity C and fast scan direction offset. The values that are programmed into the look-up table are generated by looking at each possible slope and magnitude combination and determining the appropriate exposure, i.e., intensity and offset. A shift register 162 is loaded with the intensity values and clocked such that the fast direction offset is achieved. A digital-to-analog converter 76 receives the intensity values from the shift register and controls a laser diode 78 of the printer to achieve a slow scan direction offset.

Figure 7:
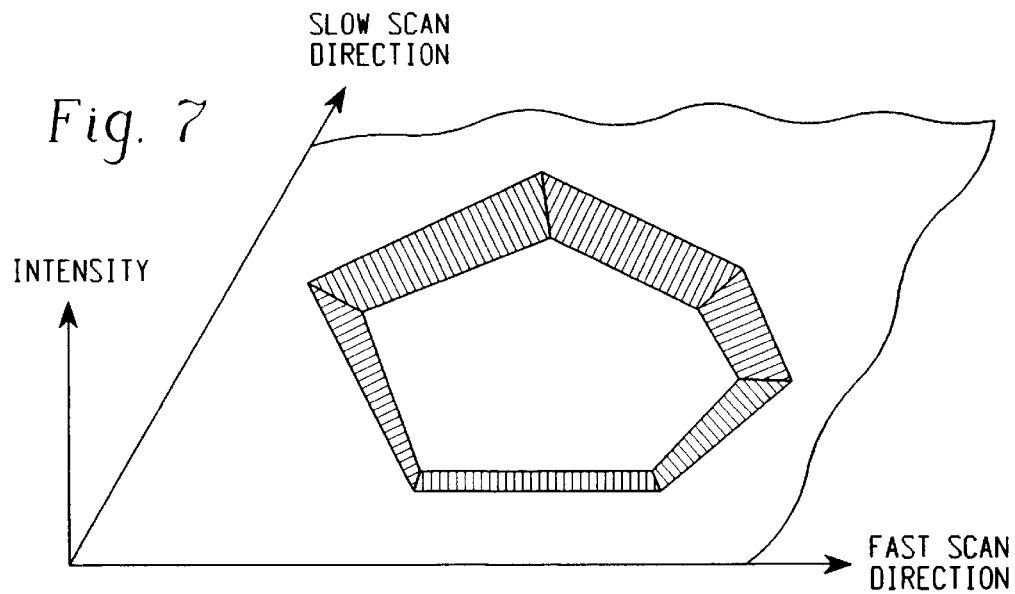
FIG. 7 illustrates a change in pixel intensity relative to the edges of the closed polygon of FIG. 2; and, FIG. 8 is a diagrammatic illustration of edge determination for a straight line of a selected width.

As illustrated in FIG. 7, as a laser printer is scanning along a raster line and encounters the slope or ramping gray scale values at a first edge of the closed region, the laser, for example, stops leaving white areas and start exposing the photoreceptor. The size of the exposure increases along the slope until it reaches the maximum or black. The raster stays in the black mode until it reaches the gray span slope at the other edge of a closed region. As it follows the slope of the opposite sense, the exposure decreases as it returns to an all white or zero exposure mode.

Figure 8:
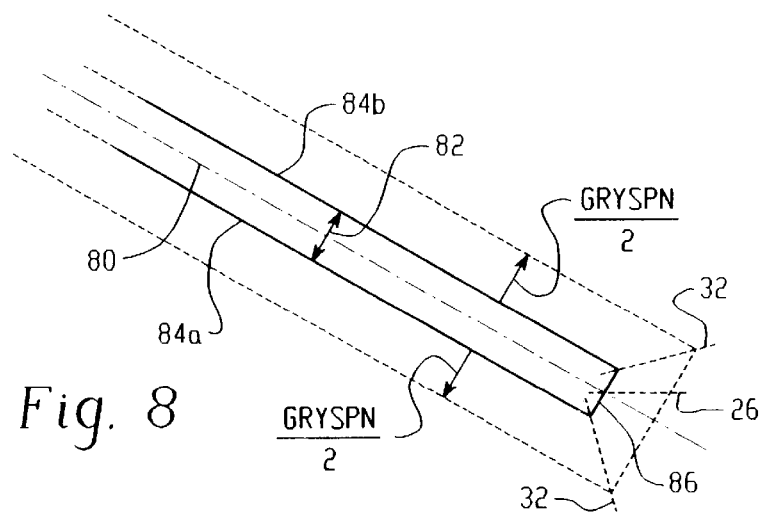

With reference to FIG. 8, lines are defined analogously to edges. Typically, the PDL type programs define (1) a center 80 of a line and (2) a line width 82. In this manner, two edges are defined, one on each side of the line. That is, two edges 84a, 84b are defined, offset from each other by the line width 82. The two edges create a white to black slope on one edge of the line and a black to white slope on the other. In this manner, the line is "filled-in" analogous to a closed loop. An end 86 of the line is preferably defined by a line perpendicular across the end between the widths. For a wide line, another edge defining region may be defined along the end of the line.

It will be appreciated that in some situations, a pixel will be within the vicinity of two edges. The pixel distance and slope are evaluated based on the closest edge.

Rather than using fixed margins, the position of the margins of the gray span region are preferably defined as follows:

$$\text{VERT. MRGN.} = \frac{GrySpn}{2} \cdot \frac{\sqrt{dp^2 + dq^2}}{|dq|}, \tag{4a}$$

$$\text{HORIZ. MRGN.} = \frac{GrySpn}{2} \cdot \frac{\sqrt{dp^2 + dq^2}}{|dp|}. \tag{4b}$$

Defining the margins of the gray span space in terms of its slow scan direction and fast scan direction coordinates facilitates a more accurate determination regarding which pixels are within the gray span region. Moreover, the magnitudes for each pixel are weighted in accordance with their distance between the edge of the gray span region and the opposite edge of the gray span region. Thus, making an accurate determination of the margins of the gray span region in the slow scan and fast scan directions facilitates an accurate determination of slope in the slow scan and fast scan directions.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of generating data for controlling a hyperacuity printer, the method comprising:

defining an edge mathematically;

defining a gray span value indicative of a number of pixel widths between boundaries disposed on opposite sides of the edge to identify pixels within a selected vicinity of the edge;

determining a distance between each pixel and the edge;

generating a magnitude for each pixel in accordance with the distance; and storing the magnitudes.

2. The method as set forth in claim 1 wherein the step of mathematically defining the edge includes:

defining a curving edge in polar coordinates.

3. The method as set forth in claim 1 wherein the step of mathematically defining the edge includes:

defining a piecewise linear edge.

4. The method as set forth in claim 1 further including:

dividing the selected vicinity into a plurality of subregions.

5. The method as set forth in claim 4 wherein the step of dividing the selected vicinity into a plurality of subregions includes:

for each of a plurality of piecewise edge segments, defining an angular bisector;

defining a mid-point bisector which extends through a mid-point of each edge segment to the selected vicinity boundaries as defined by the gray span value.

6. The method as set forth in claim 5 wherein the line through the mid-point bisector of each edge segment extends along a fast scan direction when the edge segment is within 45° of a slow scan direction and extends along the slow scan direction when the edge segment is within 45° of the fast scan direction.

7. The method as set forth in claim 1 further including:

printing a line image on the print media with a hyperacuity printer in accordance with the generated magnitudes.

8. The method as set forth in claim 7 further including:

from the stored magnitudes generating an exposure value for each pixel within the selected vicinity and printing the line image in accordance with the generated exposure values.

9. A method of generating data for controlling a hyperacuity printer, the method comprising:

defining an edge mathematically;

identifying pixels within a selected vicinity of the edge, the selected vicinity extending between the edge and a boundary disposed on one side of the edge;

determining a distance between each pixel and the edge;

generating a magnitude for each pixel in accordance with the distance; and from relative magnitudes for each of a plurality of pixels within the selected vicinity, determining a plane defined by the magnitudes, each intensity value being selected in accordance with a slope of the plane and the magnitude of the corresponding pixel.

10. The method as set forth in claim 9 further including:

determining the slope of the plane relative to orthogonal fast and slow scan directions, an intensity value for each pixel being determined in accordance with its magnitude and the two orthogonal slopes of the plane.

11. A method of controlling a hyperacuity printer, the method comprising:

determining an edge surrounding a closed region;

identifying pixels within a selected vicinity of the edge;

determining a distance between each pixel and the edge;

generating a magnitude for each pixel in accordance with the distance;

determining slopes along the edge around the closed region in accordance with the generated magnitudes for each pixel, such that the slopes extend into the regions as the banks of a lake;

commencing and ending printing as the shapes along a raster scan direction descend and ascend into and out of the region.

12. The method as set forth in claim 11 wherein the printing step includes:

scanning a laser diode along a fast scan direction;

defining the edge in polar coordinates;

controlling an intensity and timing of the laser diode in accordance with the polar coordinates.

13. An apparatus for hyperacuity printing, the apparatus comprising:

a means for defining an edge mathematically;

a means for defining a gray span value indicative of a number of pixel widths between opposite boundaries disposed symmetrically on opposite sides of the edge to identify pixels within a selected vicinity of the edge defined by the boundaries;

a means for determining a distance between each pixel in the vicinity and the edge;

a means for generating a magnitude value for each pixel in accordance with the distance between the pixel and the edge; and a memory for holding the magnitude values.

14. The apparatus as set forth in claim 13 wherein the mathematically defined edge includes a plurality of piecewise linear edge segments and further including:

a means for defining an angular bisector of adjacent piecewise linear edge segments;

a means for defining a mid-point bisector which extends through a mid-point of each edge segment to the boundaries as defined by the gray span value.

15. The apparatus as set forth in claim 13 further including:

a means for determining a plane defined by the magnitudes of the pixels within the selected vicinity;

a means for selecting an exposure value in accordance with a slope of the plane and the magnitude of the corresponding pixel.

16. The apparatus as set forth in claim 15 further including:

a means for generating an intensity and a fast scan direction offset in accordance with each exposure value.

17. The apparatus as set forth in claim 16 further including:

a laser diode which is controlled by the intensities and offsets.

18. The apparatus as set forth in claim 15 wherein the edge surrounds a closed region with the planes in the selected vicinity of the edge descending into the closed region and further including:

a means for generating an intensity and a fast scan direction offset in accordance with each exposure value;

a laser diode which is controlled by the intensities and offsets.

19. A method of hyperacuity printing a lineart picture comprising:

receiving a mathematically defined line which is defined by a pair of mathematically defined parallel edges spaced apart by a line width;

defining a vicinity adjacent each edge on a side of each edge that is opposite to the other edge;

identifying pixels within the vicinities;

finding a distance of each pixel from the adjacent edge;

redefining the edges and a gray scale slope of each vicinity in printer coordinates;

determining an intensity and fast scan direction offset for each printer pixel in accordance with the redefined edges and the gray scale slopes;

printing a lineart picture in accordance with the determined intensities with the determined offsets on a print medium.

20. The method as set forth in claim 19 wherein in the edge redefining step, the edge is defined in polar coordinates.

21. The method as set forth in claim 19 wherein the line is a line segment having first and second ends and further including edges defined oat each end such that the edges surround a closed region and the gray scale slope surrounds and descends from the closed region.

* * * * *